US007014272B1

(12) United States Patent
Williamson et al.

(10) Patent No.: US 7,014,272 B1
(45) Date of Patent: Mar. 21, 2006

(54) TOY WHEEL

(76) Inventors: Simon Williamson, 16 Howard Ave., Bourne, MA (US) 02532; Theo Giordano, 16 Howard Ave., Bourne, MA (US) 02532

( * ) Notice: Subject to any disclaimer, the term of this patent is extended or adjusted under 35 U.S.C. 154(b) by 74 days.

(21) Appl. No.: 10/740,222

(22) Filed: Dec. 18, 2003

(51) Int. Cl.
*B60B 19/00* (2006.01)
(52) U.S. Cl. .................... 301/5.1; 301/5.23; 446/448
(58) Field of Classification Search ............ 301/5.1, 301/5.23, 1, 105.1, 5.7, 64.301, 64.302, 64.303, 301/64.305; 446/431, 448, 458
See application file for complete search history.

(56) References Cited

U.S. PATENT DOCUMENTS

| 110,519 | A | | 12/1870 | Ward | |
|---|---|---|---|---|---|
| 118,855 | A | | 9/1871 | Hill | |
| 216,809 | A | * | 6/1879 | Shepherd | 446/467 |
| 227,956 | A | * | 5/1880 | Carpenter | 446/465 |
| 354,269 | A | * | 12/1886 | Teichmann | 446/458 |
| 395,219 | A | * | 12/1888 | Fallows | 446/465 |
| 464,151 | A | | 12/1891 | Doublier | |
| 608,855 | A | | 8/1898 | Hefley | |
| 833,610 | A | | 10/1906 | Liebreich et al. | |
| 2,535,396 | A | * | 12/1950 | Dube | 446/280 |
| 2,664,669 | A | * | 1/1954 | Tannen | 446/458 |
| 2,843,426 | A | * | 7/1958 | Nojima | 301/5.1 |
| 2,976,645 | A | | 3/1961 | Hight et al. | |
| 3,103,387 | A | * | 9/1963 | Saxenberg | 301/5.7 |
| 3,475,855 | A | | 11/1969 | Edwards | |
| 3,596,380 | A | | 8/1971 | Williams | |
| 3,602,550 | A | | 8/1971 | Patane | |
| 3,667,156 | A | * | 6/1972 | Tomiyama et al. | 446/458 |
| 3,711,988 | A | * | 1/1973 | Summerfield et al. | 446/412 |
| D231,111 | S | | 4/1974 | Catron | |
| 3,867,787 | A | * | 2/1975 | Weinger | 446/274 |
| 3,948,563 | A | * | 4/1976 | Replin | 301/5.1 |
| 4,035,026 | A | * | 7/1977 | Replin | 301/5.1 |
| 4,192,094 | A | * | 3/1980 | Johnson | 446/458 |
| 4,441,762 | A | | 4/1984 | Segal | |
| D281,616 | S | | 12/1985 | McGuire | |
| D284,295 | S | | 6/1986 | McGuire | |
| D308,232 | S | | 5/1990 | McGuire | |
| D333,168 | S | | 2/1993 | Huang | |
| 5,360,363 | A | | 11/1994 | Levin | |
| 5,475,572 | A | | 12/1995 | Tseng | |
| 5,683,164 | A | | 11/1997 | Chien | |
| D391,307 | S | | 2/1998 | Kuo | |
| 5,876,108 | A | | 3/1999 | Chien | |
| D412,724 | S | | 8/1999 | Raundahl | |

* cited by examiner

*Primary Examiner*—Russell D. Stormer
(74) *Attorney, Agent, or Firm*—Salter & Michaelson

(57) ABSTRACT

A self-contained toy wheel having a rim with a tire which revolves around a weighted, stationary hub assembly. The hub assembly has an off-center weight which keeps the hub assembly at the same orientation at all times regardless of rim position, speed or angle of motion.

24 Claims, 8 Drawing Sheets

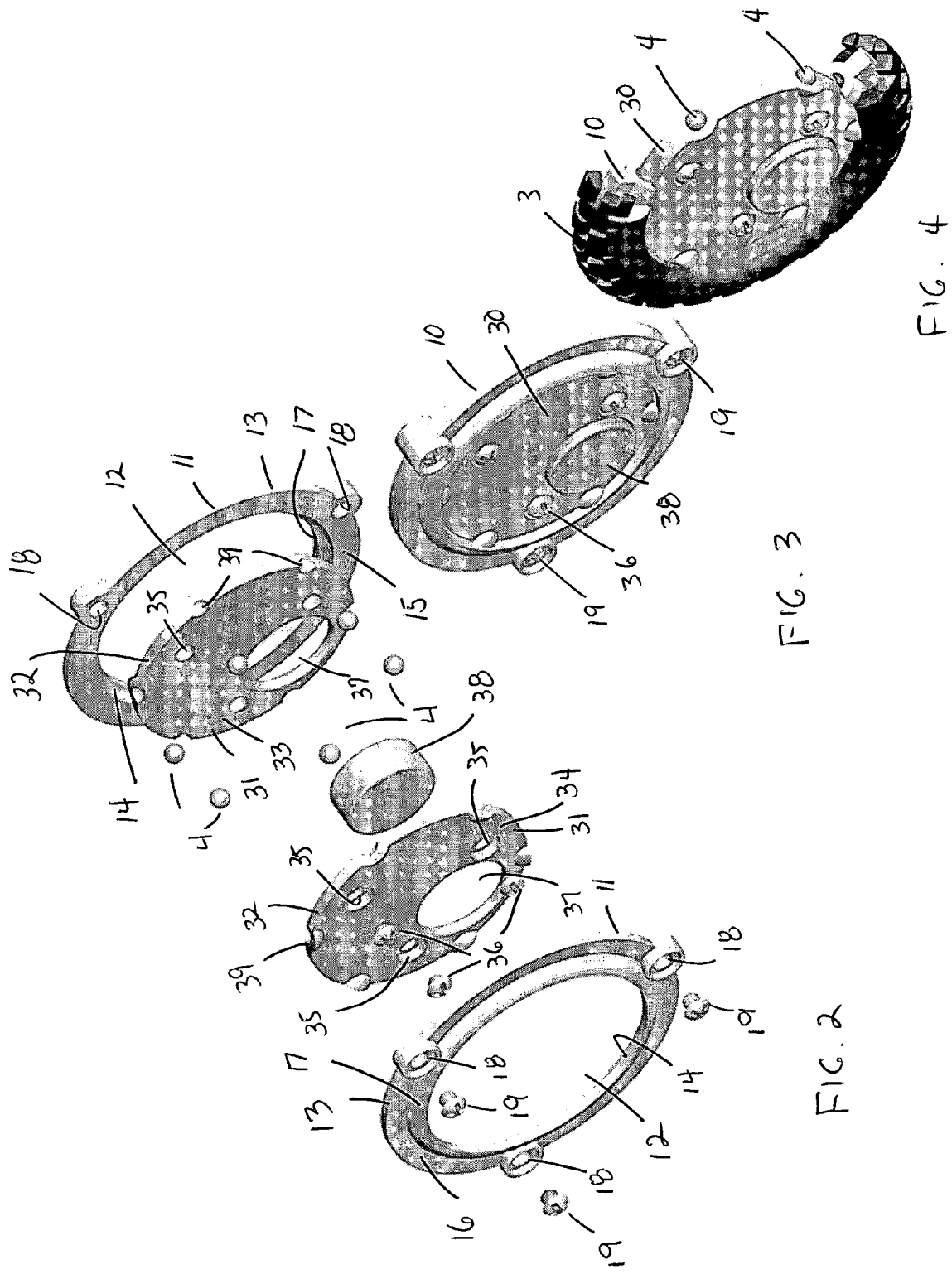

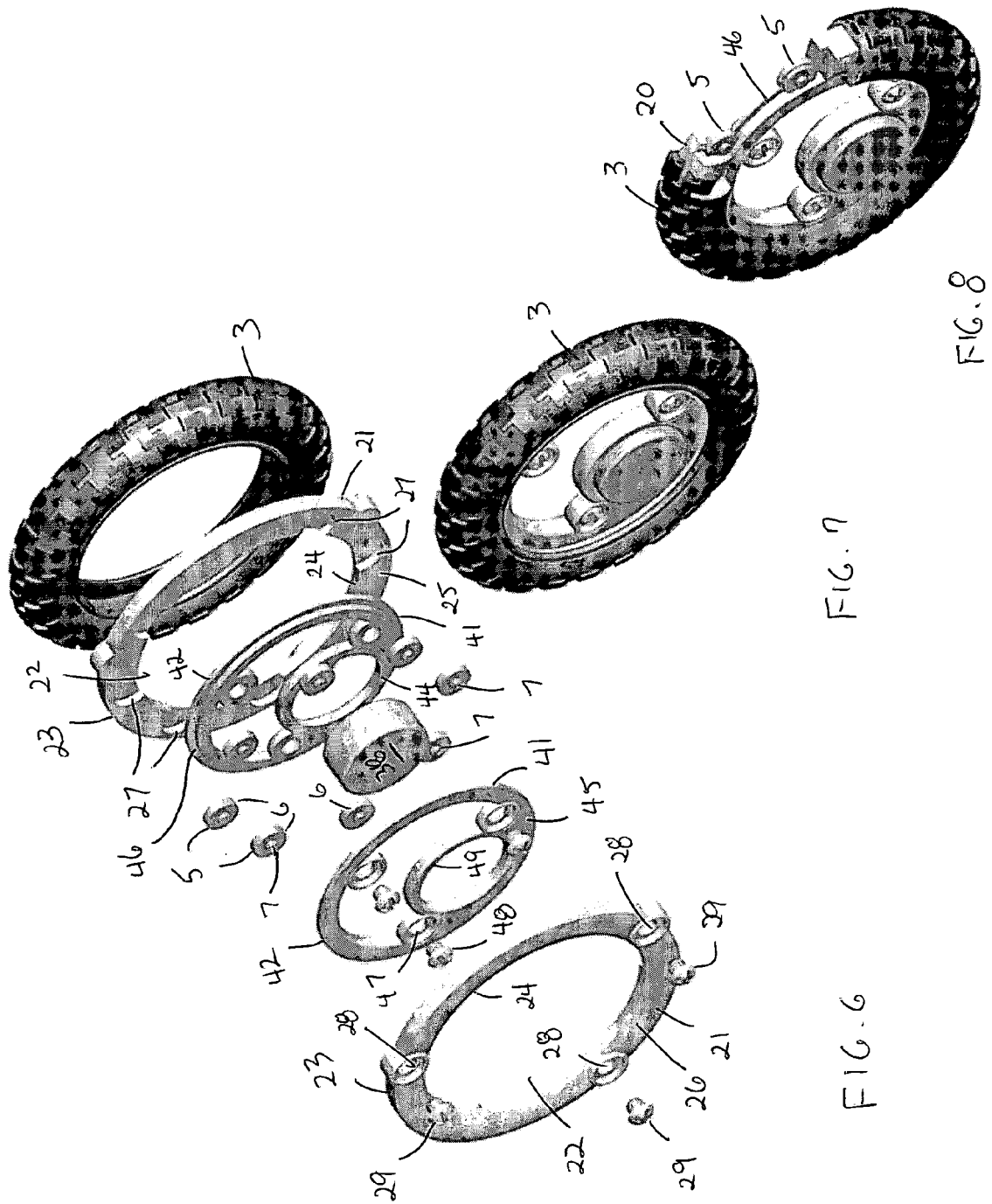

TOY WHEEL

BACKGROUND OF THE INVENTION

This invention relates generally to toys, and in particular, to a self-contained toy wheel.

The object of the present invention is to provide a toy which provides considerable interest and amusement to the user.

SUMMARY OF THE INVENTION

The present invention provides a single wheel toy that can be manually propelled. A rim with a tire revolves around a weighted, stationary hub assembly, which facilitates a specific method of play and propulsion.

These together with other objects of the invention, along with various features of novelty which characterize the invention, are pointed out with particularity in the claims annexed hereto and forming a part of this disclosure. For a better understanding of the invention, its operating advantages and the specific objects attained by its uses, reference should be had to the accompanying drawings and descriptive matter in which there is illustrated a preferred embodiment of the invention.

BRIEF DESCRIPTION OF THE DRAWINGS

FIG. 2 is an exploded view of the first embodiment without a tire.

FIG. 3 is an assembled view of the first embodiment without a tire.

FIG. 4 is an assembled view of the first embodiment, partly in section.

FIG. 6 is an exploded view of the second embodiment without a tire.

FIG. 7 is an assembled view of the second embodiment without a tire.

FIG. 8 is an assembled view of the second embodiment, partly in section.

DETAILED DESCRIPTION OF INVENTION

Figure 1A:
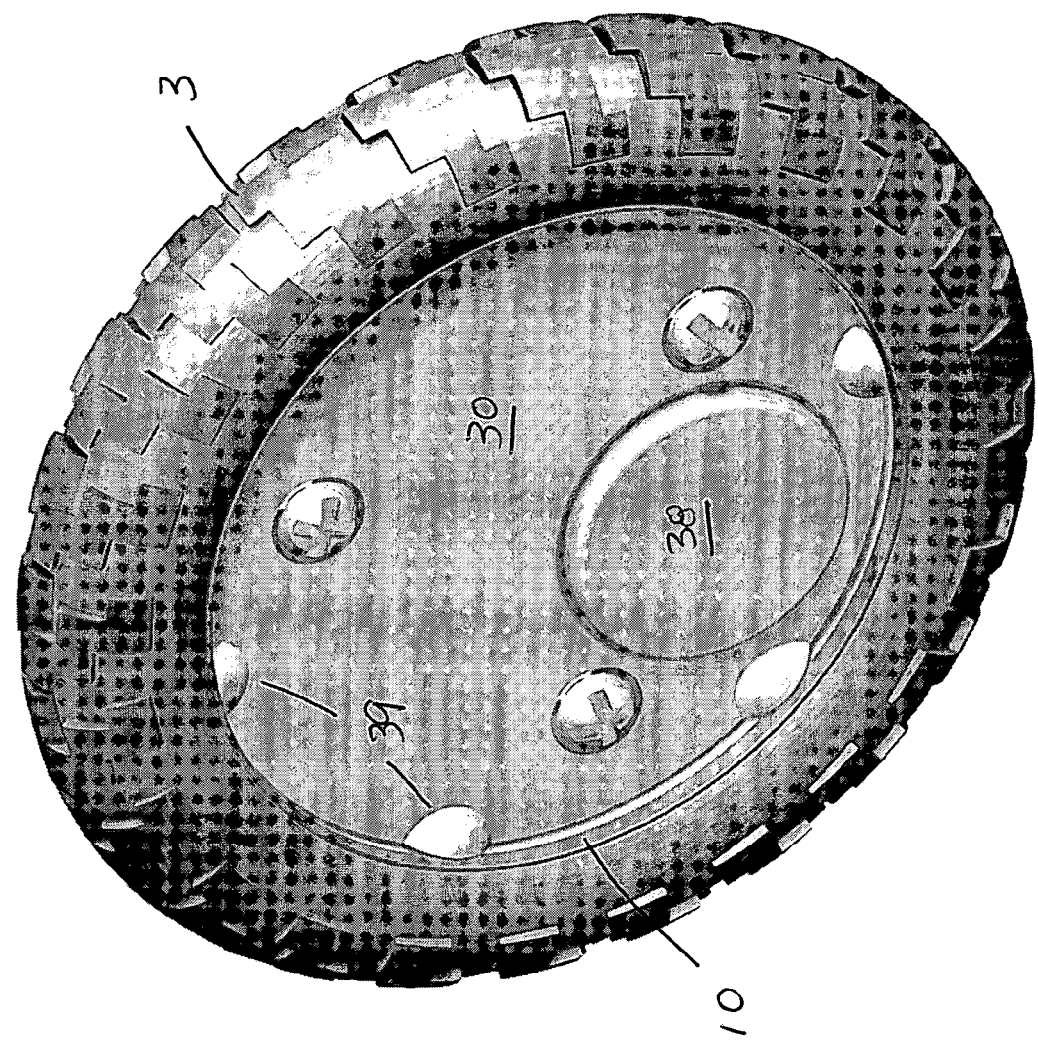
FIG. 1A is a side perspective view of a first embodiment of the invention.
Figure 1B:
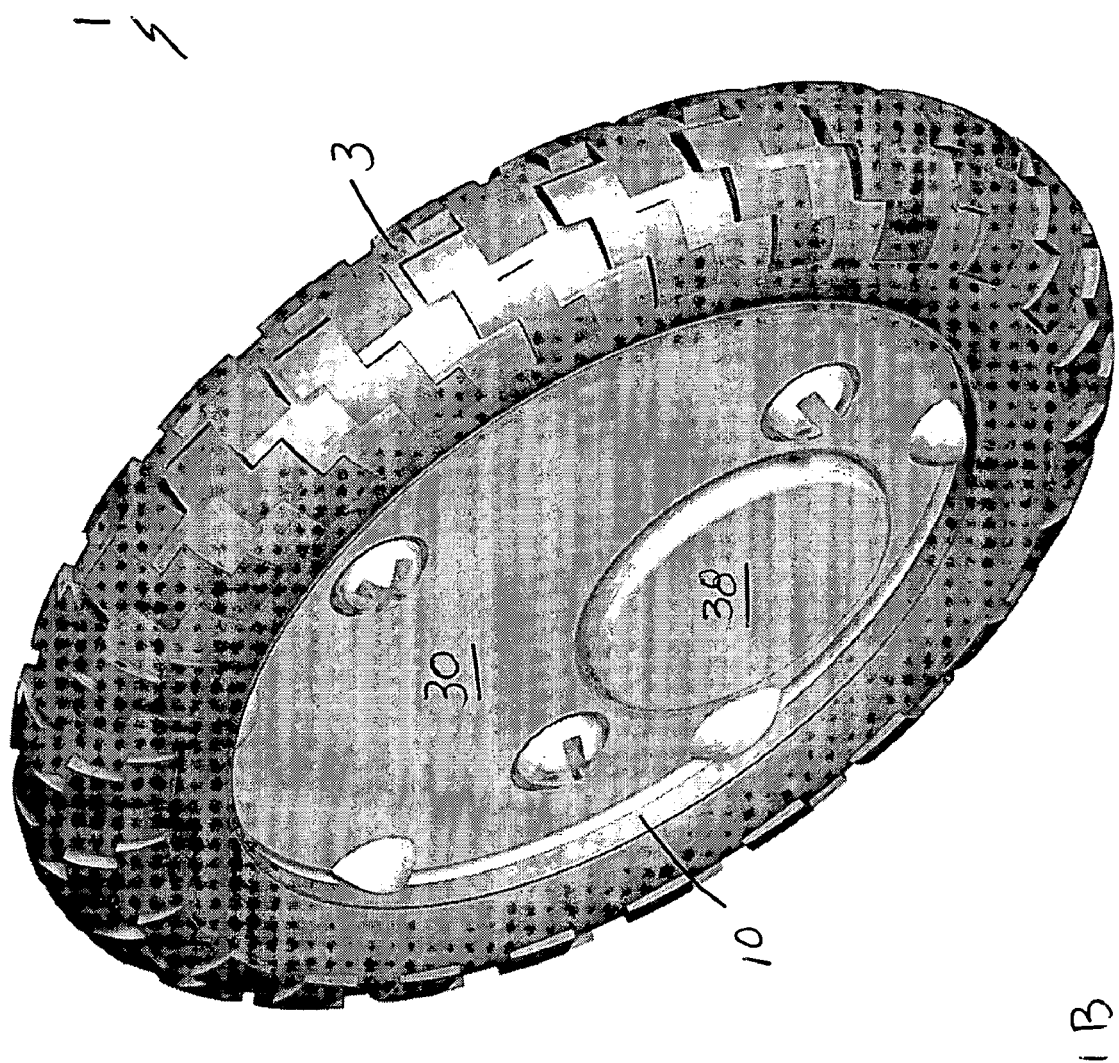
FIG. 1B is a front perspective view thereof.
Figure 1C:
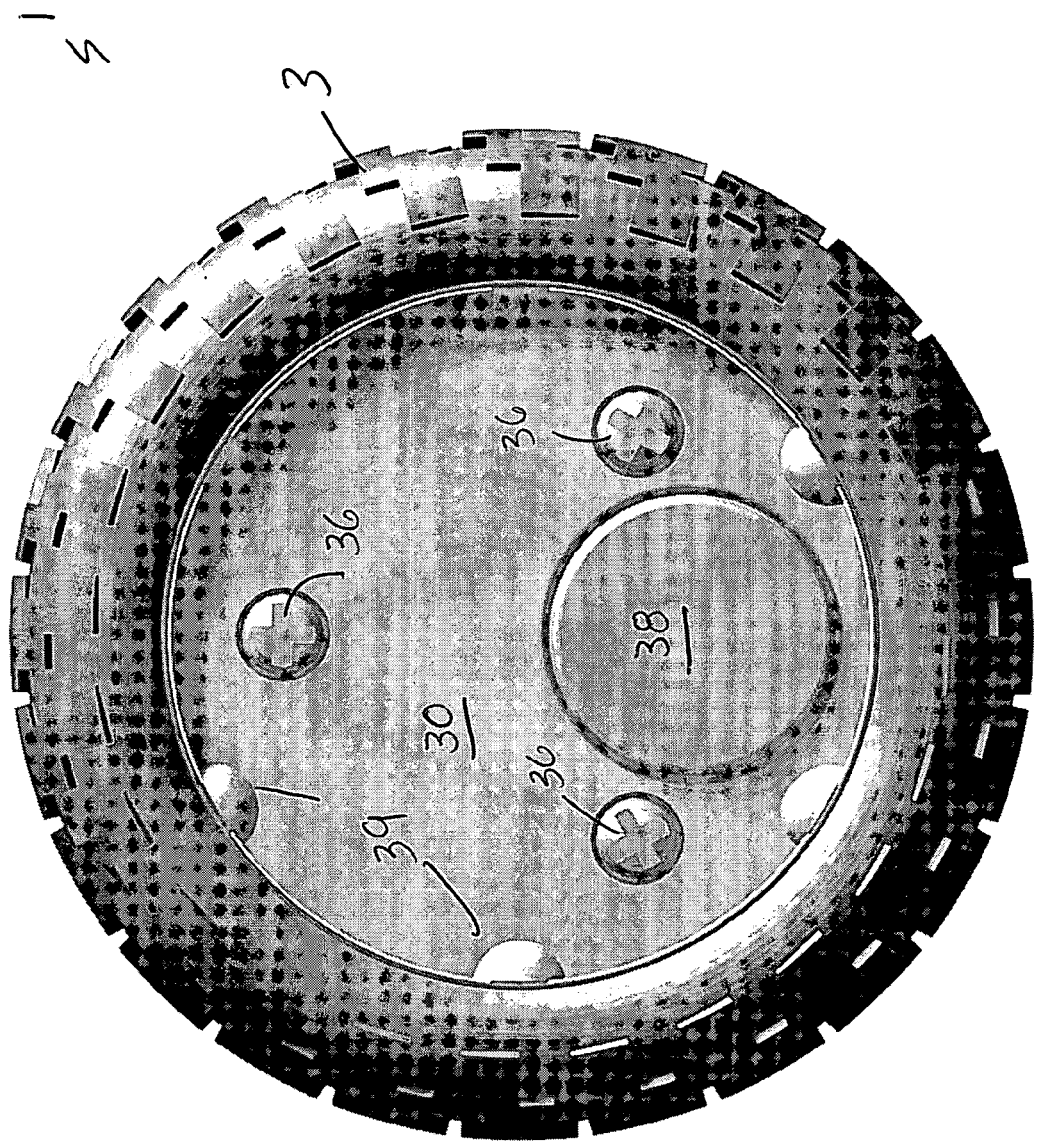
FIG. 1C is a side elevational view thereof.
Figure 5A:
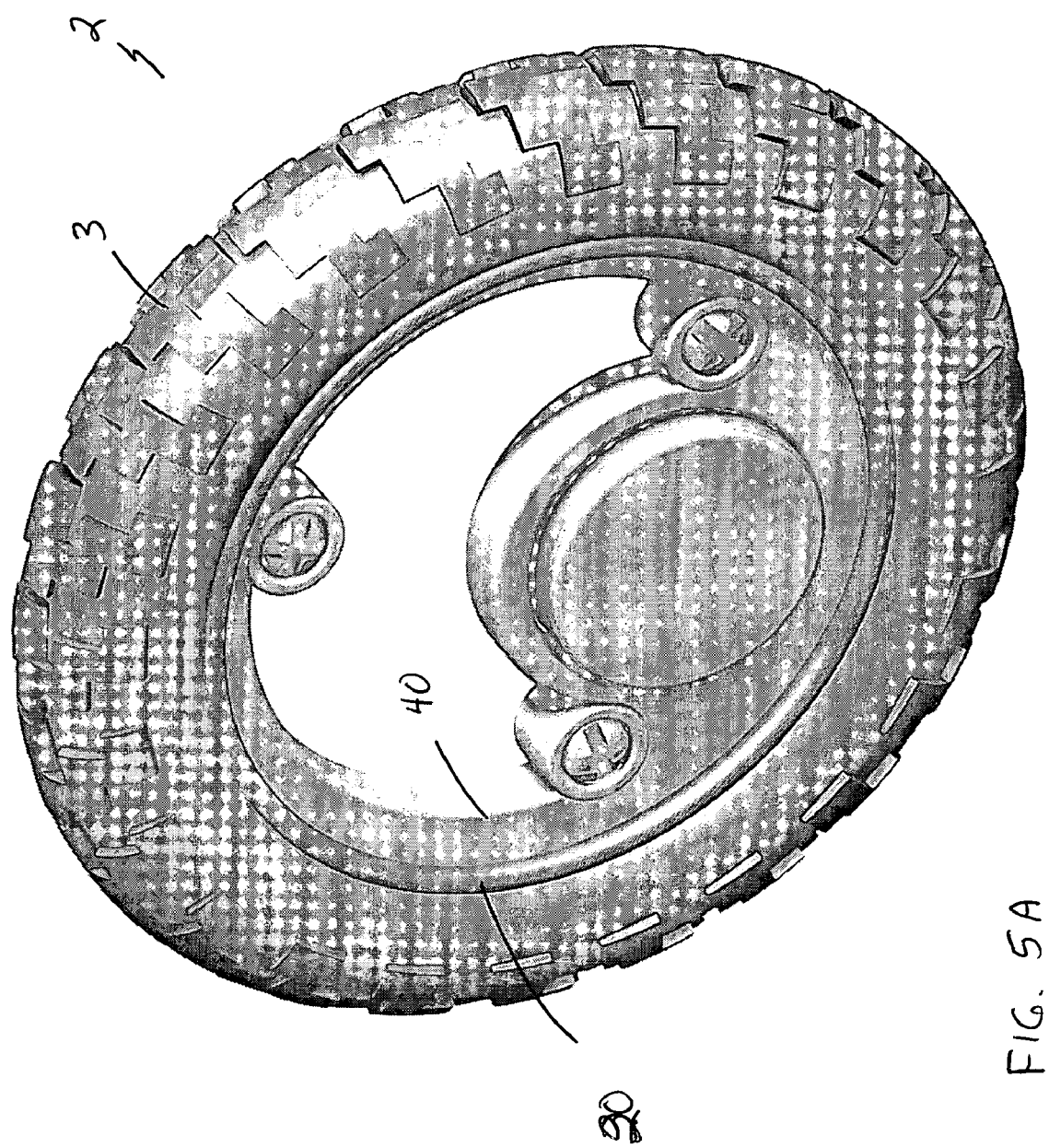
FIG. 5A is a side perspective view of a second embodiment of the invention.
Figure 5B:
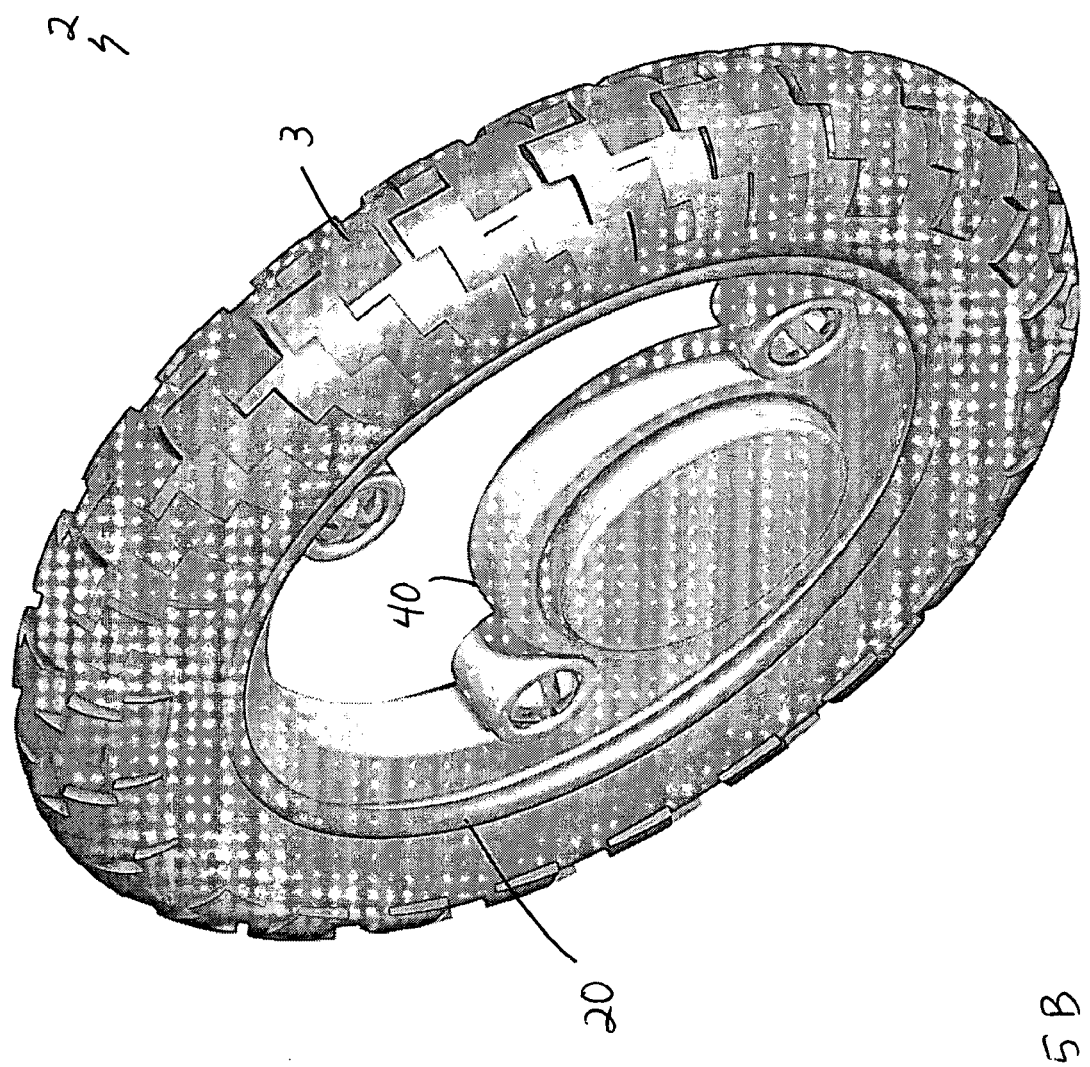
FIG. 5B is a front perspective view thereof.
Figure 5C:
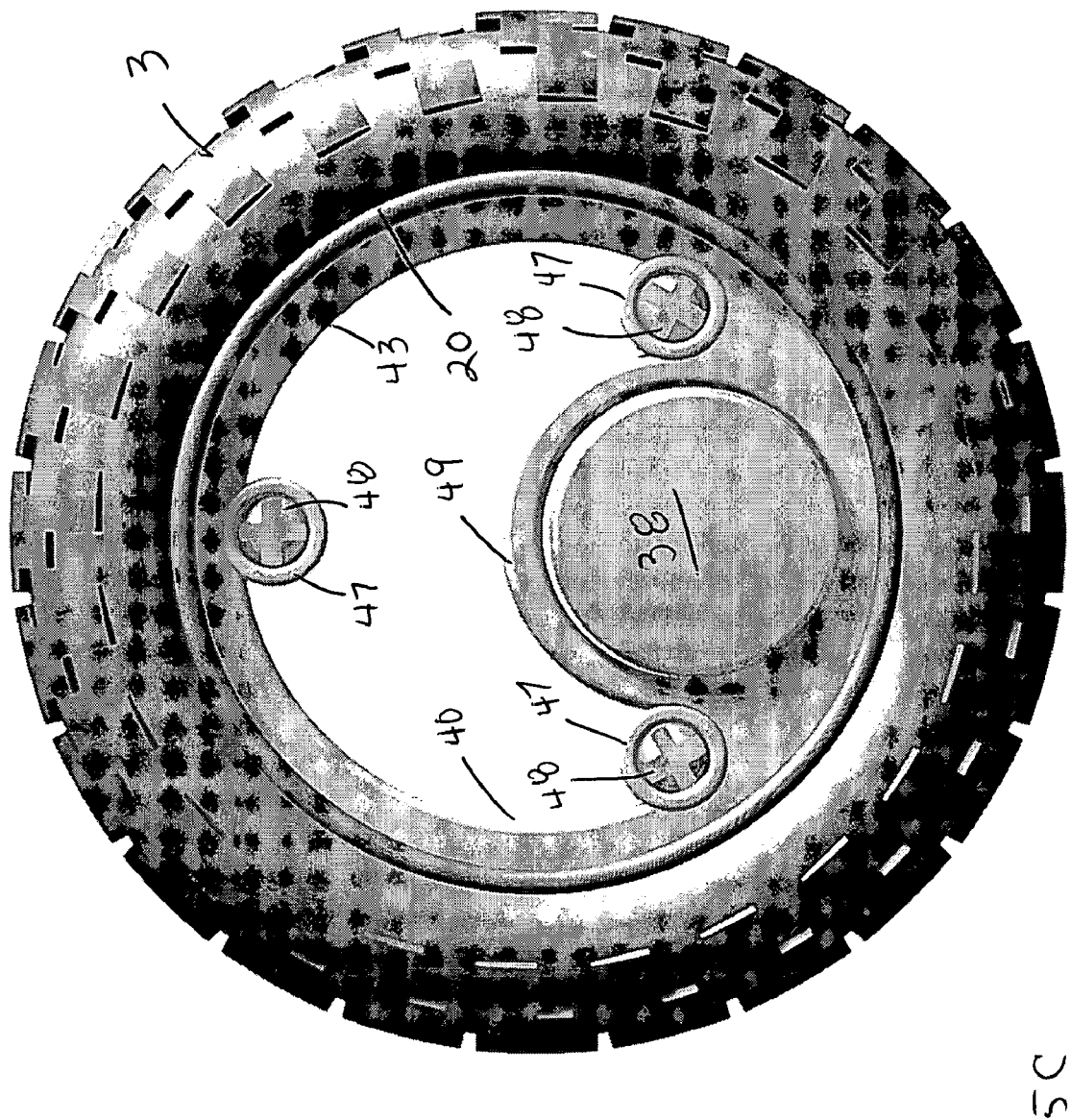
FIG. 5C is a side elevational view thereof.

Referring to the drawings in detail wherein like elements are indicated by like numerals, there is shown in FIGS. 1–4 a first embodiment 1 of the invention and in FIGS. 5–8 a second embodiment 2 of the invention, both embodiments constructed according to the principles of the present invention. Each toy wheel 1, 2 is comprised of a rim assembly 10, 20 and a hub assembly 30, 40. Both toy wheel embodiments 1, 2 are adapted to having a tire 3 fitted over the rim assemblies 10, 20.

Referring more particularly to FIGS. 1–4, the first invention embodiment 1 is based upon the use of ball bearings 4. The toy wheel rim assembly 10 is comprised of two annular rings 11, each a mirror image of the other. The rings 11 each have a substantial and round central opening 12, an outer perimeter 13, an inner perimeter 14 defining the central opening 12, a flat interior side 15 facing the other ring, and an outer side 16. Each ring outer side 16 has a curved flange 17 extending out from the inner perimeter 14 and extending a predetermined distance toward a ring central axis. Each ring 11 has three threaded apertures 18 equidistantly formed therein and extending partly above the outer perimeter 13, each said aperture 18 extending from the outer side 16 through the ring 11 and out through the interior side 15, each said aperture 18 having a central axis transverse to a ring radial axis. The rings 11 are positioned against each other with the apertures 18 of one ring aligned with the apertures 18 of the other ring. The rim assembly 10 includes three threaded fasteners 19, each adapted to threadingly engage two adjacent apertures 18 thereby fixedly attaching one ring to the other. A tire 3 may be fitted over the rim assembly joined ring outer perimeters 13.

The toy wheel hub assembly 30 of the first invention embodiment is comprised of two generally flat, round disks 31, each a mirror image of the other. The disks 31 each have an outer perimeter 32, a flat interior side 33 facing the other disk, and an outer side 34. Each disk 31 has three threaded apertures 35 equidistantly formed about the disks, each said aperture 35 extending from the outer side 34 through the disk 31 and out through the interior side 33, each said aperture 35 having a central axis transverse to a disk radial axis. The disks 31 are positioned against each other with the apertures 35 of one disk aligned with the apertures 35 of the other disk. The hub assembly 30 includes three threaded fasteners 36, each adapted to threadingly engage two adjacent apertures 35 thereby fixedly attaching one disk to the other. Each disk 31 has a substantial off-center and round opening 37 adjacent the outer perimeter 32. The disk openings 37 for each disk 31 match and are aligned when the disks 31 are connected to each other. The hub assembly disk opening 37 is adapted to receive and hold a cylindrical weight 38. Each disk outer perimeter 32 has an eight indentations 39 formed therein, said indentations being positioned equidistantly about the disk outer perimeter 32. The outer perimeter indentations 39 of one disk 31 are aligned with the outer perimeter indentations of the other disk when the disks are joined together.

A ball bearing 4 is placed into each hub assembly indentation 39. The hub assembly 30 is positioned within the rim assembly central opening 12. The rim assembly central opening curved flanges 17 hold the hub assembly 30 within the rim assembly central opening 12 and trap the ball bearings 4. The ball bearings 4 rotate within the hub assembly indentations 39 and against the inner perimeters 14 of the rim assembly rings 11 with little friction. The hub assembly weight 38 keeps the hub assembly 30 at the same orientation at all times regardless of rim assembly 10 speed or angle of motion.

Referring more particularly to FIGS. 5–8, the second invention embodiment 2 is based upon the use of roller bearings 5. The toy wheel rim assembly 20 is comprised of two annular outer rings 21, each a mirror image of the other. The outer rings 21 each have a substantial and round central opening 22, an outer perimeter 23, an inner perimeter 24 defining the central opening 22, a flat interior side 25 facing the other outer ring, and an outer side 26. Each outer ring inner side 26 has a eight slots 27 formed therein radially extending from the inner perimeter 24 a predetermined distance toward the outer perimeter 23, said slots 27 being positioned equidistantly about the outer ring inner side 26. The slots 27 of one outer ring 21 are aligned with the slots of the other outer ring when the outer rings are joined together. Each outer ring 21 has three threaded apertures 28 equidistantly formed therein and extending partly above the outer perimeter 23, each said aperture 28 extending from the outer side 26 through the outer ring 21 and out through the interior side 25, each said aperture 28 having a central axis transverse to an outer ring radial axis. The outer rings 21 are positioned against each other with the apertures 28 of one outer ring aligned with the apertures 28 of the other outer ring. The rim assembly 20 includes three threaded fasteners 29, each adapted to threadingly engage two adjacent apertures 28 thereby fixedly attaching one outer ring to the other. A tire 3 may be fitted over the rim assembly joined outer ring outer perimeters 23.

The toy wheel hub assembly 40 of the second invention embodiment is comprised of two inner rings 41, each a mirror image of the other. Each inner ring 41 has an outer perimeter 42, an inner perimeter 43, an interior side 44 facing the other inner ring, and an outer side 45. Each interior side 44 has an annular groove 46 formed therein adjacent the outer perimeter 42. Each inner ring 41 has three threaded aperture rings 47 equidistantly formed about the rings attached to the inner ring inner perimeter 43, each said aperture 47 having a central axis transverse to an inner ring radial axis. The inner rings 41 are positioned against each other with the apertures 47 of one inner ring aligned with the apertures 47 of the other inner ring. The hub assembly 40 includes three threaded fasteners 48, each adapted to threadingly engage two adjacent apertures 47 thereby fixedly attaching one inner ring to the other. Each inner ring 41 has a substantial holding ring 49 off-center and attached to a portion of the inner ring inner perimeter 43. The holding rings 49 for each inner ring 41 match and are aligned when the inner rings 41 are connected to each other. The hub assembly holding rings 49 are adapted to receive and hold a cylindrical weight 38.

The hub assembly 40 is positioned within the rim assembly central opening 22. The hub assembly 40 is further comprised of eight roller bearings 5 each comprised of a roller disk 6 and a central shaft 7 extending centrally from each side of the roller disk. The roller disks 6 are placed into the hub assembly annular groove 46, wherein each roller bearing central shaft 7 engages a set of rim assembly slots 27. The roller bearings 5 rotate within the hub assembly annular groove 46 and are held in place by the roller bearing shaft 7 engagement with the rim assembly slots 27. The hub assembly weight 38 keeps the hub assembly 40 at the same orientation at all times regardless of rim assembly 20 speed or angle of motion.

It is understood that the above-described embodiment is merely illustrative of the application. Other embodiments may be readily devised by those skilled in the art which will embody the principles of the invention and fall within the spirit and scope thereof. For example more or less ball bearings and/or roller bearings may be used. More or less threaded apertures may be used for joining rings and disks. In the hub assemblies more than one opening and/or holding ring may be used, along with additional weights. In addition to weights, decorative displays may be used. Tires of various styles may be used, e.g., all-terrain, smooth, etc. The rim assemblies may also be stylized with commercial themes, fantasy themes, robotic, wings, etc. Several wheels may be joined together or to a common structure.

We claim:

1. A toy wheel, comprising:
a rim assembly; and
a hub assembly rotatably joined to said rim assembly;
wherein:
said rim assembly is comprised of two annular rings, each a mirror image of the other, each said ring having a substantial central opening, an outer perimeter, an inner perimeter defining the central opening, a flat interior side facing the other ring, and an outer side, each said ring outer side having a curved flange extending out from the inner perimeter and extending a predetermined distance toward a ring central axis, each said ring interior side being joined to the interior side of the other ring;
said hub assembly is comprised of:
two generally flat, round disks, each a mirror image of the other, each said disk having an outer perimeter having a plurality of equidistantly positioned indentations formed therein, a flat interior side facing the other disk, and an outer side, each said disk having an off-center opening adjacent the disk outer perimeter, said off-center opening being matched and aligned with the other disk, each said disk interior side being joined to the interior side of the other disk, wherein the outer perimeter indentations of one disk are aligned with the outer perimeter indentations of the other disk forming a plurality of hub assembly indentations;
at least one weighted element adapted to being inserted into the off-center opening;
a plurality of ball bearings, each ball bearing being placed into a hub assembly indentation;
wherein the hub assembly is positioned within the rim assembly central opening, said rim assembly central opening curved flanges adapted to hold the hub assembly within the rim assembly central opening and trap the ball bearings, said ball bearings rotating within the hub assembly indentations and against the inner perimeter of the rim assembly rings.

2. A toy wheel as recited in claim 1, further comprising:
a tire fitted over the rim assembly joined ring outer perimeters.

3. A toy wheel as recited in claim 2, further comprising:
a plurality of threaded apertures equidistantly formed in each ring, each said aperture extending from the outer side through the ring and out through the interior side, each said aperture having a central axis transverse to a ring radial axis, said apertures of one ring being aligned with the apertures of the other ring; and
a plurality of threaded fasteners, each adapted to threadingly engage two aligned and adjacent apertures thereby fixedly attaching one ring to the other.

4. A toy wheel as recited in claim 3, further comprising:
a plurality of threaded apertures equidistantly formed in each disk, each said aperture extending from the outer side through the disk and out through the interior side, each said aperture having a central axis transverse to a disk radial axis, said apertures of one disk being aligned with the apertures of the other disk; and
a plurality of threaded fasteners, each adapted to threadingly engage two aligned and adjacent disk apertures thereby fixedly attaching one disk to the other.

5. A toy wheel comprising:
a rim assembly; and
a hub assembly rotatably joined to said rim assembly;
wherein:
said rim assembly is comprised of two annular outer rings, each a mirror image of the other, each said outer ring having a substantial central opening, an outer perimeter, an inner perimeter defining the central opening, a flat interior side facing the other outer ring, and an outer side, each said outer ring inner side having a plurality of slots formed therein and radially extending from the inner perimeter a predetermined distance toward the outer perimeter, said slots being positioned equidistantly about the outer ring inner side, each said outer ring interior side being joined to the interior side of the other outer ring, said slots of one outer ring being aligned with the slots of the other outer ring;

said hub assembly is comprised of:

two inner rings, each a mirror image of the other, each said inner ring having an outer perimeter, an inner perimeter, an interior side facing the other inner ring, and an outer side, each interior side having an annular groove formed therein adjacent the outer perimeter, each said inner ring interior side being joined to the interior side of the other inner ring, each inner ring having a at least one holding ring attached to a portion of the inner ring inner perimeter, said holding ring for each inner ring being matched and aligned when the inner rings are joined;

at least one weighted element adapted to being inserted into the holding ring;

a plurality of roller bearings each comprised of a roller disk and a central shaft extending laterally and centrally from each side of the roller disk, each roller disks being placed into the hub assembly annular groove;

wherein said hub assembly is positioned within the rim assembly central opening;

wherein each roller bearing central shaft engages two adjacent outer ring slots;

wherein the roller bearings rotate within the hub assembly annular groove and are held in place by the roller bearing shaft engagement with the outer ring slots.

6. A toy wheel as recited in claim 5, further comprising:
a tire fitted over the rim assembly joined outer ring outer perimeters.

7. A toy wheel as recited in claim 6, further comprising:
a plurality of threaded apertures equidistantly formed in each outer ring, each said aperture extending from the outer side through the outer ring and out through the interior side, each said aperture having a central axis transverse to an outer ring radial axis, said apertures of one outer ring being aligned with the apertures of the other ring; and
a plurality of threaded fasteners, each adapted to threadingly engage two aligned and adjacent apertures thereby fixedly attaching one outer ring to the other.

8. A toy wheel as recited in claim 7, further comprising:
a plurality of threaded aperture rings equidistantly formed about each inner ring and attached to the inner ring inner perimeter, each said aperture having a central axis transverse to an inner ring radial axis, said aperture rings of one inner ring being aligned with the aperture rings of the other inner ring; and
a plurality of threaded fasteners, each adapted to threadingly engage two aligned and adjacent apertures thereby fixedly attaching one inner ring to the other.

9. A toy wheel, comprising:
a rim assembly; and
a hub assembly rotatably joined to said rim assembly;
wherein:
said rim assembly is comprised of two annular rings, each said ring having a substantial central opening, an outer perimeter, an inner perimeter defining the central opening, an interior side facing the other ring, and an outer side, each said ring interior side being joined to the interior side of the other ring;
said hub assembly is comprised of:
two disks, each said disk having an outer perimeter having a plurality of peripherally disposed indentations formed therein, a flat interior side facing the other disk, and an outer side, each said disk having an off-center opening adjacent the disk outer perimeter, said off-center opening being matched and aligned with the other disk, each said disk interior side being joined to the interior side of the other disk, wherein the outer perimeter indentations of one disk are aligned with the outer perimeter indentations of the other disk forming a plurality of hub assembly indentations;

at least one weighted element adapted to being inserted into the off-center opening;

a plurality of ball bearings, each ball bearing being placed into a hub assembly indentation;

wherein the hub assembly is positioned within the rim assembly central opening, said ball bearings rotating within the hub assembly indentations.

10. A toy wheel as recited in claim 9, further comprising:
each annular ring of the rim assembly being a mirror image of the other;
each disk of the hub assembly being a mirror image of the other;
each said ring outer side having a curved flange extending out from the inner perimeter and extending a predetermined distance toward a ring central axis;
said rim assembly central opening curved flanges adapted to hold the hub assembly within the rim assembly central opening and trap the ball bearings, said ball bearings rotating within the hub assembly indentations and against the inner perimeter of the rim assembly rings.

11. A toy wheel as recited in claim 9, further comprising:
a plurality of threaded apertures equidistantly formed in each ring, each said aperture extending from the outer side through the ring and out through the interior side, each said aperture having a central axis transverse to a ring radial axis, said apertures of one ring being aligned with the apertures of the other ring; and
a plurality of threaded fasteners, each adapted to threadingly engage two aligned and adjacent apertures thereby fixedly attaching one ring to the other.

12. A toy wheel as recited in claim 9, further comprising:
a plurality of threaded apertures equidistantly formed in each disk, each said aperture extending from the outer side through the disk and out through the interior side, each said aperture having a central axis transverse to a disk radial axis, said apertures of one disk being aligned with the apertures of the other disk; and
a plurality of threaded fasteners, each adapted to threadingly engage two aligned and adjacent disk apertures thereby fixedly attaching one disk to the other.

13. A toy wheel comprising:
a rim assembly; and
a hub assembly rotatably joined to said rim assembly;
wherein:
said rim assembly is comprised of two annular outer rings, each said outer ring having a substantial central opening, an outer perimeter, an inner perimeter defining the central opening, an interior side facing the other outer ring, and an outer side, each said outer ring inner side having a plurality of slots formed therein and radially extending from the inner perimeter a predetermined distance toward the outer perimeter, said slots being positioned about the outer ring inner side, each said outer ring interior side being joined to the interior side of the other outer ring, said slots of one outer ring being aligned with the slots of the other outer ring;

said hub assembly is comprised of:
two inner rings, each said inner ring having an outer perimeter, an inner perimeter, an interior side facing the other inner ring, and an outer side, each interior side having an annular groove formed therein adjacent the outer perimeter, each said inner ring interior side being joined to the interior side of the other inner ring, each inner ring having at least one holding ring attached to a portion of the inner ring inner perimeter, said holding ring for each inner ring being matched and aligned when the inner rings are joined;
at least one weighted element adapted to being inserted into the holding ring;
a plurality of roller bearings each being placed into the hub assembly annular groove;
wherein said hub assembly is positioned within the rim assembly central opening;
wherein each roller bearing engages two adjacent outer ring slots; and
wherein the roller bearings rotate within the hub assembly annular groove and are held in place by engagement with the outer ring slots.

14. A toy wheel as recited in claim 13, further comprising:
wherein each said roller bearing comprises a roller disk and a central shaft extending laterally from each side of the roller;
wherein the roller disks rotates within the hub assembly annular groove and are held in place by the roller bearing shaft emgagement with the outer ring slots.

15. A toy wheel as recited in claim 13, further comprising:
a plurality of threaded apertures equidistantly formed in each outer ring, each said aperture extending from the outer side through the outer ring and out through the interior side, each said aperture having a central axis transverse to an outer ring radial axis, said apertures of one outer ring being aligned with the apertures of the other ring; and
a plurality of threaded fasteners, each adapted to threadingly engage two aligned and adjacent apertures thereby fixedly attaching one outer ring to the other.

16. A toy wheel as recited in claim 13, further comprising:
a plurality of threaded aperture rings equidistantly formed about each inner ring and attached to the inner ring inner perimeter, each said aperture having a central axis transverse to an inner ring radial axis, said aperture rings of one inner ring being aligned with the aperture rings of the other inner ring; and
a plurality of threaded fasteners, each adapted to threadingly engage two aligned and adjacent apertures thereby fixedly attaching one inner ring to the other.

17. A wheel apparatus, comprising:
a rim assembly; and
a hub assembly rotatably joined to said rim assembly;
said rim assembly is comprised of two annular rings, each said ring having a substantial central opening, an outer perimeter, an inner perimeter defining the central opening, an interior side facing the other ring, and an outer side, each said ring interior side being joined to the interior side of the other ring;
said hub assembly is comprised of two disks, each said disk having a diameter less than the diameter of the rim assembly rings, an outer perimeter, an interior side facing the other disk, and an outer side, each said disk interior side being joined to the interior side of the other disk;
a plurality of bearings;
each said hub assembly disk having means spacedly disposed at the outer perimeter thereof for receiving and supporting said plurality of bearings therebetween;
said hub assembly being positioned within the rim assembly central opening;
said bearings supported for rotation within the hub assembly and against the rim assembly rings.

18. A wheel apparatus as recited in claim 17 wherein each said disk has at least one off-center opening adjacent the disk outer perimeter, said off-center opening being matched and aligned with the other disk, and at least one weighted element adapted to being inserted into the off-center opening.

19. A wheel apparatus as recited in claim 17 wherein said means for receiving and supporting the bearings comprises a plurality of equidistantly positioned indentations formed in each disk, the outer perimeter indentations of one disk being aligned with the outer perimeter indentations of the other disk forming a plurality of hub assembly indentations.

20. A wheel apparatus as recited in claim 19 wherein said bearings are ball bearings, each ball bearing being placed into a hub assembly indentation, said hub assembly being positioned within the rim assembly central opening, said rim assembly central opening having a curved flange adapted to hold the hub assembly within the rim assembly central opening and trap the ball bearings, said ball bearings rotating within the hub assembly indentations and against the inner perimeter of the rim assembly rings.

21. A wheel apparatus as recited in claim 17, further comprising:
a plurality of threaded apertures equidistantly formed in each outer ring, each said aperture extending from the outer side through the outer ring and out through the interior side, each said aperture having a central axis transverse to an outer ring radial axis, said apertures of one outer ring being aligned with the apertures of the other ring; and
a plurality of threaded fasteners, each adapted to threadingly engage two aligned and adjacent apertures thereby fixedly attaching one outer ring to the other.

22. A wheel apparatus as recited in claim 17, further comprising:
a plurality of threaded aperture rings equidistantly formed about each inner ring and attached to the inner ring inner perimeter, each said aperture having a central axis transverse to an inner ring radial axis, said aperture rings of one inner ring being aligned with the aperture rings of the other inner ring; and
a plurality of threaded fasteners, each adapted to threadingly engage two aligned and adjacent apertures thereby fixedly attaching one inner ring to the other.

23. A wheel apparatus as recited in claim 17 wherein each interior side of the disk has an annular groove formed therein adjacent the outer perimeter, said means for receiving and supporting the bearings comprising an annular groove formed in the interior side of each ring and disposed adjacent the outer perimeter.

24. A wheel apparatus as recited in claim 23 wherein said bearings comprise a plurality of roller bearings each comprised of a roller disk and a central shaft extending laterally and centrally from each side of the roller disk, each roller disks being placed into the hub assembly annular groove, said hub assembly being positioned within the rim assembly central opening, each roller bearing central shaft engaging two adjacent outer ring slots, said roller bearings being rotatable within the hub assembly annular groove and held in place by the roller bearing shaft engagement with the outer ring slots.

* * * * *